Oct. 27, 1953 — D. C. PORTER — 2,656,606
SURVEYING INSTRUMENT
Filed March 12, 1951 — 2 Sheets-Sheet 1

DONALD C. PORTER,
INVENTOR.

ATTORNEY.

Oct. 27, 1953 D. C. PORTER 2,656,606
SURVEYING INSTRUMENT
Filed March 12, 1951 2 Sheets-Sheet 2

DONALD C. PORTER,
INVENTOR.

BY
ATTORNEY.

Patented Oct. 27, 1953

2,656,606

UNITED STATES PATENT OFFICE 2,656,606

SURVEYING INSTRUMENT

Donald C. Porter, Bakersfield, Calif.

Application March 12, 1951, Serial No. 215,078

3 Claims. (Cl. 33—69)

This invention relates to a toy device, and particularly to a toy surveyor's instrument of the transit or level type.

Toy devices simulating standard instruments in different fields of use are known, the present invention being directed to a surveyor's transit or level type of instrument which will function in the same manner as a standard commercial type transit and provide a child with both amusement and education in the use of such an instrument.

The unit may be made of various materials, and is so designed that the parts may be molded from plastic. It can be presented for sale in a knocked-down condition, the parts being so designed that they may be easily and quickly assembled by children into a working instrument. The transit will permit the child to survey by determining levels, azimuths, elevations, the location of boundaries, markers, and other similar results. In other words, the device can serve all the purposes of a standard surveyor's transit and level, while the instrument is designed to be economically constructed so as to be available at a reasonable cost.

The principal object of the invention, therefore, is to provide an improved construction of a surveyor's instrument serviceable as a transit and/or level.

Another object of the invention is to provide an improved surveyor's transit which has a minimum of parts and which may be of molded materials, such as plastic, and produced at a minimum cost.

A further object of the invention is to provide a toy surveyor's transit which may be quickly and easily assembled from the component parts thereof and which will function in the same manner as a commercial form of transit.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figures 1, 2, 6:
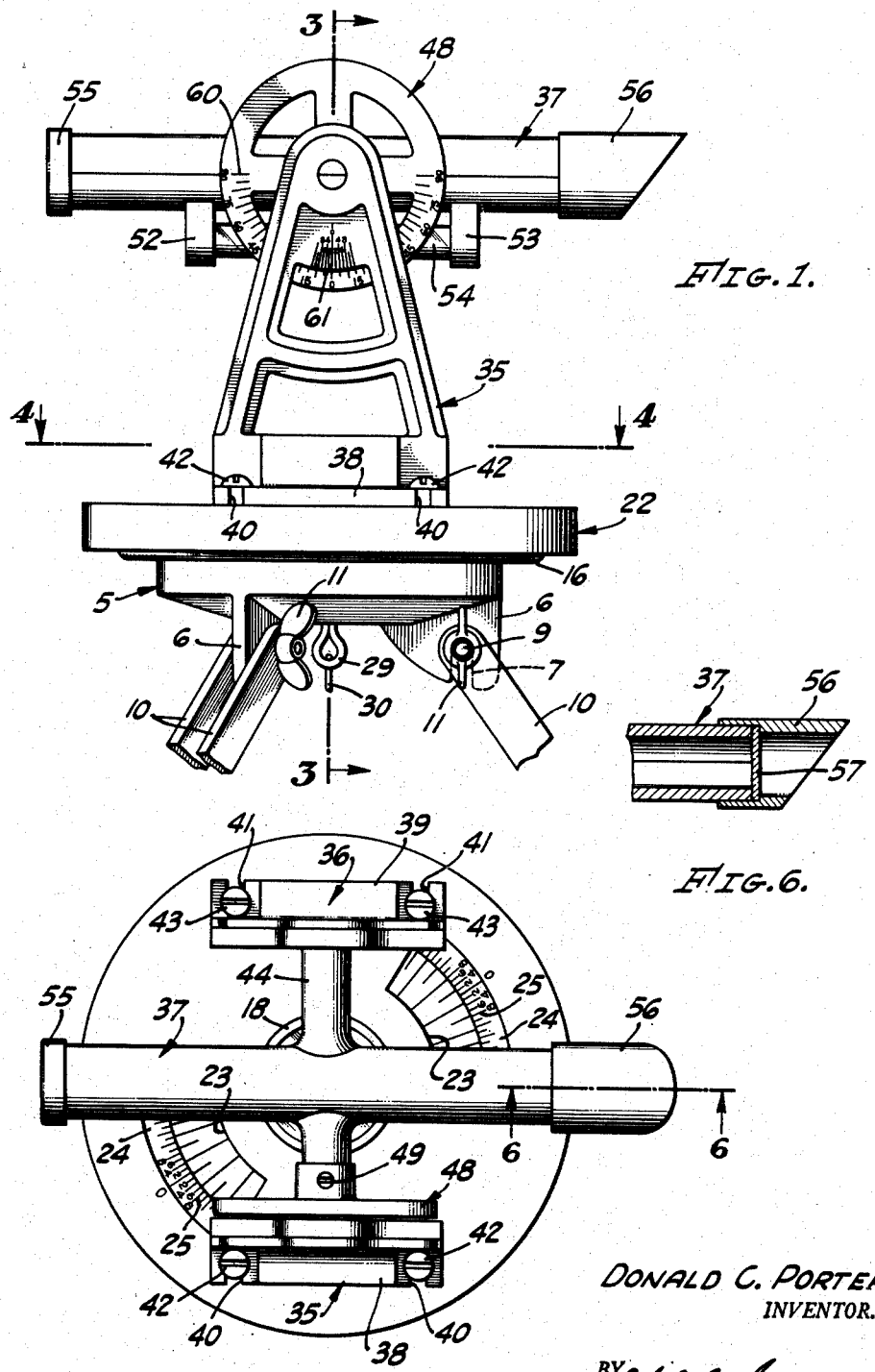
Fig. 1 is a side, elevational view of the instrument of the invention.
Fig. 2 is a plan view of the instrument shown in Fig. 1.
Fig. 6 is a detailed view of the elements at one end of the sighting telescope of the invention taken along the line 6—6 of Fig. 2.

Referring now to the drawings, in which the same numerals identify like elements, a circular tripod base 5 has three depending flanges or fins 6 which are slotted as shown at 7 to readily receive the bolts 9 of the upper ends of the tripod legs 10. Wing nuts, such as shown at 11, may tighten the legs to the base 5.

Figure 3:
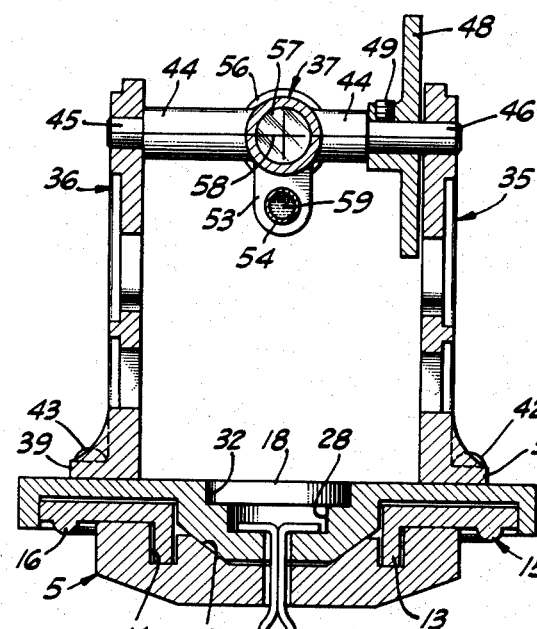
Fig. 3 is a cross-sectional view of the instrument taken along the line 3—3 of Fig. 1.
Figure 4:
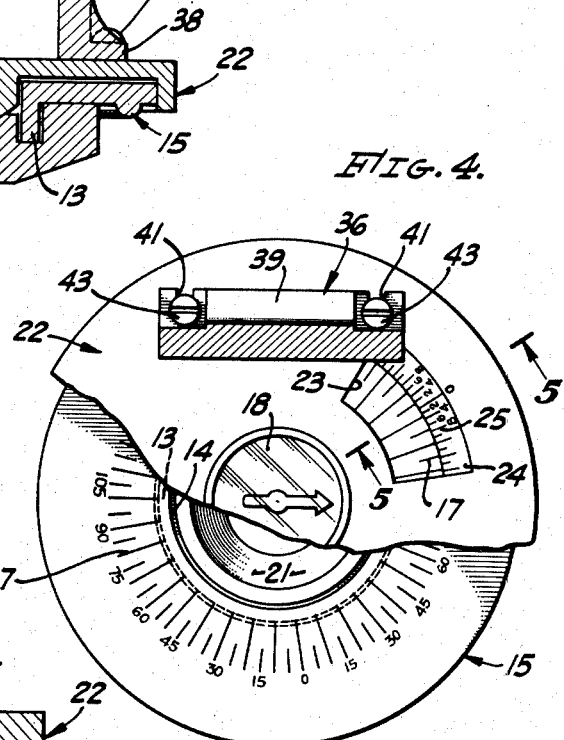
Fig. 4 is a plan view of the instrument taken along the line 4—4 of Fig. 1.
Figure 5:
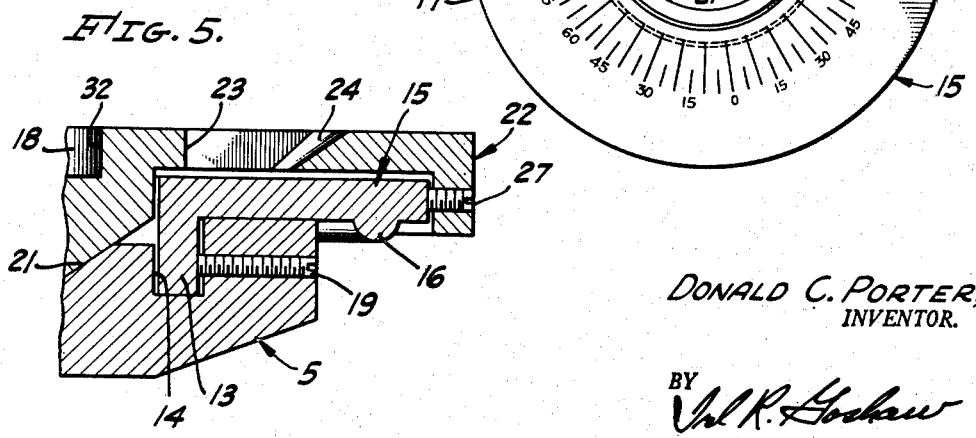
Fig. 5 is a detailed cross-sectional view of the azimuth adjustment elements taken along the line 5—5 of Fig. 4.

As shown in Figs. 3 and 5, the base 5 has an annular groove 14 therein, in which is a depending flange 13 of an annular index plate 15, the plate extending over the rim of the base 5 and having, under the over-hanging portion, a knurled annular rib 16. The purpose of the rib 16 is to permit hand rotation of the plate 15 with respect to the base 5 so that any particular number of the indicia 17 may be positioned with respect to the indications of a compass 18. For instance, zero of the indicia may be set at North, after which the plate 15 is tightened against the tripod base 5 by a set screw 19.

Within the disc portion 21 of the base 5 is the telescope mounting and vernier plate 22, which has a pair of windows 23 therein, and along the sloping sides 24 of which are vernier indicia 25. Thus, when the plate 22 is rotated with respect to the indicia plate 15, azimuths may be accurately read. To maintain the plate 22 fixed with respect to the plate 15, a set screw 27 is provided.

The plate 22 has two recesses 28 and 32 of different diameters at the center thereof, the smaller diameter recess 28 supporting the bent over ends of a cotter pin 29, which passes through openings in the plate 22 and base 5. In the eye of the cotter pin is attached a string 30 on the end of which is a plumb bob 31. Thus, the center of the transit may be accurately positioned with respect to a marker or other reference point. Positioned in the larger diameter recess 32, is the compass 18 for determining directions.

Mounted on the plate 22 are two vertical, triangularly shaped trunnion standards 35 and 36 for the sighting or telescope tube shown generally at 37. The standards have right angle base flanges 38 and 39 with slots therein, such as shown at 40 and 41, which readily accommodate screws 42 and 43 for attaching the standards to the plate 22. The telescope tube is formed of two semi-cylindrical mating portions, the upper portion forming half the tube and half of the axle which has enlarged sections 44 and smaller diameter bearing portions 45 and 46. The ends of the bearing portions extend into bearing openings at the upper ends of the standards 35 and 36. The smaller diameter portions 46 are longer than the portions 45, and have mounted thereon an indicia wheel 48 attached to the portions 46 by set screw 49. The lower half of the telescope tube 37 is the same as the upper half, but has depending therefrom level supporting brackets 52 and 53 for a bubble level 54, the liquid of which is shown at 59 in Fig. 3.

Referring to Fig. 1, the left-hand end of telescope tube 37 has a cap 55, and the right-hand end has a sun shade 56 which holds a glass 57 against the end of the tube and which has cross hairs 58 marked thereon. The sun shade 56 may also be drilled in both the vertical and horizontal axes, and wires inserted to form the cross hairs. In this modification, no glass 57 is required. A glass may or may not be mounted in the eye cap 55. The friction between the shaft end portions 45 and 46 in the bearing openings in the standards 35 and 36 is such that the telescope 37 may be adjusted to any angle and held in that position. To determine elevation, the indicia 60 on the wheel 48 are used in connection with a vernier scale 61 on the outer surface of the web of standard 35. Thus, angles of elevation may be rapidly determined by the two scales 60 and 61.

By the shape and form of the base 5 and plates 15 and 22, they may be easily, quickly, and correctly assembled. That is, plate 15 is positioned by its depending flange 13, and plate 22, by its beveled center portion. The trunnion standards 35 and 36 and the upper and lower sections of the sighting or telescope tube with its axle portions may also be quickly and correctly assembled. Thus, the complete instrument has a minimum of parts, which may be rapidly and economically molded and rapidly assembled to provide a functionable surveyor's toy transit or level when used with a target rod and measuring tape or chain. The instrument is not only educational, since it is adapted to teach standard surveying procedures, but will provide amusement as well.

I claim:

1. A surveying instrument adapted to be mounted on a tripod comprising a circular base plate with depending flanges to which said tripod may be attached, said base plate having a central opening, a central recess and a surrounding annular recess, a first rotatable plate having a central opening with a diameter greater than the diameter of said central recess in said base plate and adapted to have a portion thereof mounted in said annular recess of said base plate, a surface of said rotatable plate contacting a surface of said base plate, a second rotatable plate having a central opening, a surface parallel with the surface of said first rotatable plate and having a surface extending into and contacting a surface of said central recess of said base plate, means passing through all of said central openings for holding all of said respective contacting surfaces in contact with one another, a pair of trunnion standards mounted on said second rotatable plate and having bearing surfaces in the ends thereof, a telescope tube having an axle mounted on said bearing surfaces, a level supported by said telescope tube, and an indicia wheel mounted on said telescope tube axle for measuring the angle of tilt thereof.

2. A surveying instrument in accordance with claim 1 in which a compass is mounted on said second rotatable plate and a plumb bob is supported by said means for holding the surfaces of said plates in contact.

3. A surveying instrument in accordance with claim 1 in which said rotatable plate has a portion extending beyond the outer diameter of said base plate, said extending portion having means thereon for manually rotating said first rotatable plate with respect to said base plate, and means for controlling the relative rotation of said rotatable plates with respect to one another and said base plate.

DONALD C. PORTER.

References Cited in the file of this patent

UNITED STATES PATENTS

| Number | Name | Date |
| --- | --- | --- |
| 720,844 | Rafferty | Feb. 17, 1903 |
| 2,132,170 | Langsner | Oct. 4, 1938 |
| 2,237,329 | Bischof | Apr. 8, 1941 |
| 2,374,124 | Peer | Apr. 17, 1945 |

FOREIGN PATENTS

| Number | Country | Date |
| --- | --- | --- |
| 3,929 | Great Britain | Aug. 14, 1883 |

OTHER REFERENCES

"Plastic Sextant": Review of Scientific Instruments, vol. 15, page 273 (November 1944).